United States Patent
Su et al.

(10) Patent No.: US 8,624,207 B2
(45) Date of Patent: Jan. 7, 2014

(54) ARRAY-TYPE-TRANSDUCER-BASED HIGH-POWER ULTRASOUND DELIVERY SYSTEM

(75) Inventors: Cheng-Huang Su, Taipei (TW); Hung-I Yeh, Taipei (TW)

(73) Assignee: Mackay Memorial Hospital, Zhongshan District, Taipei (TW)

( * ) Notice: Subject to any disclaimer, the term of this patent is extended or adjusted under 35 U.S.C. 154(b) by 209 days.

(21) Appl. No.: 13/305,840

(22) Filed: Nov. 29, 2011

(65) Prior Publication Data

US 2013/0089469 A1 Apr. 11, 2013

(30) Foreign Application Priority Data

Oct. 6, 2011 (TW) .............................. 100136371 A

(51) Int. Cl.
| | |
|---|---|
| *B06B 1/00* | (2006.01) |
| *G01N 23/00* | (2006.01) |
| *A61N 5/00* | (2006.01) |
| *G01N 21/00* | (2006.01) |
| *A23C 3/07* | (2006.01) |
| *A61B 8/14* | (2006.01) |

(52) U.S. Cl.
USPC ........ 250/494.1; 134/184; 250/428; 250/433; 250/454.11; 250/491.1; 250/492.1; 99/451; 210/241; 600/459

(58) Field of Classification Search
USPC ................ 422/20, 127–128, 905; 134/1, 184; 250/428, 433, 454.11, 491.1, 492.1, 250/494.1; 99/451; 210/748.02, 748.03, 210/241; 600/459; 435/6, 91.2, 287.2; 204/157.15; 426/238, 560, 565, 601, 426/401, 953
See application file for complete search history.

(56) References Cited

U.S. PATENT DOCUMENTS 7,354,556 B2 * 4/2008 Perkins .................... 422/128

* cited by examiner

*Primary Examiner* — Monzer Chorbaji
(74) *Attorney, Agent, or Firm* — Stites & Harbison PLLC; Juan Carlos A. Marquez, Esq.

(57) ABSTRACT

The present invention is disclosed an array-type-transducer-based high-power ultrasound delivery system which includes a support bracket, an array-type ultrasound transducer, and a plurality of containers. The support bracket includes a plurality of grooves, and the array-type ultrasound transducer includes a clamp and N ultrasound transducers. The clamp includes a plurality of wedges configured for engaging in the grooves of the support bracket and thereby connecting the array-type ultrasound transducer to the support bracket. The containers are arranged in a two-dimensional matrix so that the ultrasound transducers of the array-type ultrasound transducer can dip into and leave the ultrasound-conducting medium in the containers vertically. The disclosed system features high operation speed and low labor requirement. Moreover, the depth by which and the time for which the ultrasound transducers dip into the ultrasound-conducting medium in the containers can be controlled and quantified.

11 Claims, 6 Drawing Sheets

ARRAY-TYPE-TRANSDUCER-BASED HIGH-POWER ULTRASOUND DELIVERY SYSTEM

BACKGROUND OF THE INVENTION

1. Technical Field

The present invention relates to an array-type-transducer-based high-power ultrasound delivery system and, more particularly, to an array-type macromolecule delivery system based on high-power ultrasound and microbubbles.

2. Description of Related Art

The technical development and applications of high-power ultrasound in the medical equipment industry, among others, have reached a highly mature stage. Ultrasound transducers and emission control systems are also well-known and mature technologies. As the biomedical effects of ultrasound in medical applications are correlated to the initial mode, acoustic power, and emission duration of the ultrasound employed, the US Food and Drug Administration (FDA) has set up regulations in this regard.

Conventionally, when ultrasound is applied to a cell-containing nutrient broth in a Petri dish, a physical phenomenon known as "inertial cavitation" takes place in the ultrasound-conducting liquid medium. Briefly stated, when ultrasound is transmitted through an ultrasound-conducting liquid medium, the energy of the ultrasound causes the liquid molecules to produce countless vacuum bubbles, which expand rapidly and collapse as soon as the surface of the bubbles can no longer resist the external liquid pressure.

More specifically, when the acoustic pressure of the ultrasound in the ultrasound-conducting liquid medium accumulates to a certain level, the bubbles begin to expand and are squeezed and closed in the positive-pressure area. When the countless tiny vacuum bubbles in the ultrasound-conducting liquid medium eventually implode violently due to compression and rarefaction in the oscillating process, the breaking bubbles accelerate and hence make a huge impact (up to thousands of atmospheres of pressure locally) on the membranes of the cells. Such a strong impact not only can enhance the permeation of macromolecules (e.g., plasmid DNA, particles, and drug molecules) through the cell membranes, but also forms microscopic pores on the membranes, the latter process called "sonoporation". The micropores on the cell membranes will disappear in 24 hours, thus bringing the membranes back to their original state.

Sonoporation is very likely to be a result of the inertial cavitation mechanism, and this physical property has given rise to the development of the ultrasonic microbubble-based delivery method in the 1990s, with a view to achieving gene delivery through sonoporation. This microbubble-based method can be used to deliver macromolecules such as plasmid DNA, functional genes, particles, drug molecules, or even nanoparticles to various types of cells, including, for example, primary cells, stem cells, endothelial progenitor cells, or cell lines.

However, in the case of ultrasonic microbubble-based delivery systems that are designed to deliver macromolecules to cells of various types, all the systems in the literature and currently available on the market—be they of the continuous wave or pulsed wave type, and regardless of whether they are for commercial use or are self-made systems—are high-power ultrasound systems with a single-element ultrasound transducer. In other words, only one transducer is used in each system to perform ultrasonic radiation.

Since an ultrasound system with a single-element ultrasound transducer can only perform ultrasonic radiation on one culture well at a time, the entire operation, which typically involves a plurality of culture wells, is disadvantageously time-consuming and labor intensive. Moreover, as the ultrasound transducer is manually lowered into each culture well, the depth by which the ultrasound transducer dips into the ultrasound-conducting liquid medium cannot be standardized, nor can the radiation time be quantified. These add to the drawbacks of the conventional ultrasound systems.

SUMMARY OF THE INVENTION

The primary object of the present invention is to solve the problem of time-consuming and labor-intensive operation of the conventional ultrasound-transducer-based delivery systems as can be attributed to the use of a single ultrasound transducer.

Another object of the present invention is to solve the problem that the conventional ultrasound-transducer-based delivery systems do not allow quantification of the time for which and the depth by which the ultrasound transducer dips into an ultrasound-conducting liquid medium.

To achieve the foregoing objects, the present invention provides an array-type-transducer-based high-power ultrasound delivery system which includes a support bracket and an array-type ultrasound transducer. The support bracket includes a set of first support members which form a vertical height, and a set of second support members each horizontally connected to one end of a corresponding one of the first support members and each having a plurality of grooves. The array-type ultrasound transducer includes a clamp which has N openings arranged in a one-dimensional array, where N is a positive integer. The clamp also has a wedge on each of its two lateral sides, and the wedges can be moved in a Y-axis direction to engage in the grooves. In addition, the array-type ultrasound transducer includes N ultrasound transducers respectively engaged in the openings.

Implementation of the present invention at least involves the following inventive steps:

1. The use of multiple ultrasound transducers instead of a single ultrasound transducer increases operation speed and lowers labor requirement.

2. The clamp can be moved, and the ultrasound transducers operated, in a fully automatic, partially automatic, or manual manner to enable control and quantification of the depth by which the ultrasound transducers dip into an ultrasound-conducting medium.

The detailed features and advantages of the present invention will be described in detail with reference to a preferred embodiment so as to enable persons skilled in the art to gain insight into the technical disclosure of the present invention, implement the present invention accordingly, and readily understand the objects and advantages of the present invention by perusal of the contents disclosed in the specification, the claims, and the accompanying drawings.

DETAILED DESCRIPTION OF THE INVENTION

Figure 1A:
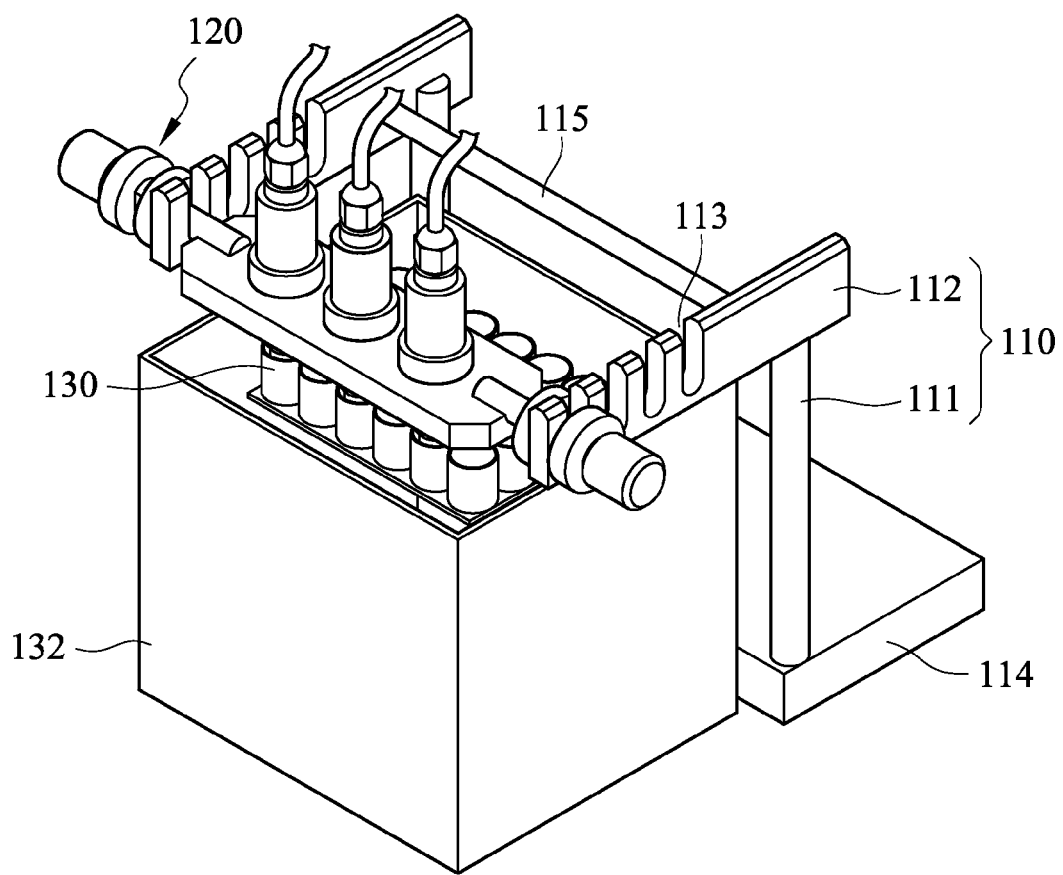
FIG. 1A is an assembled perspective view of an array-type-transducer-based high-power ultrasound delivery system in accordance with an embodiment of the present invention.
Figure 1B:
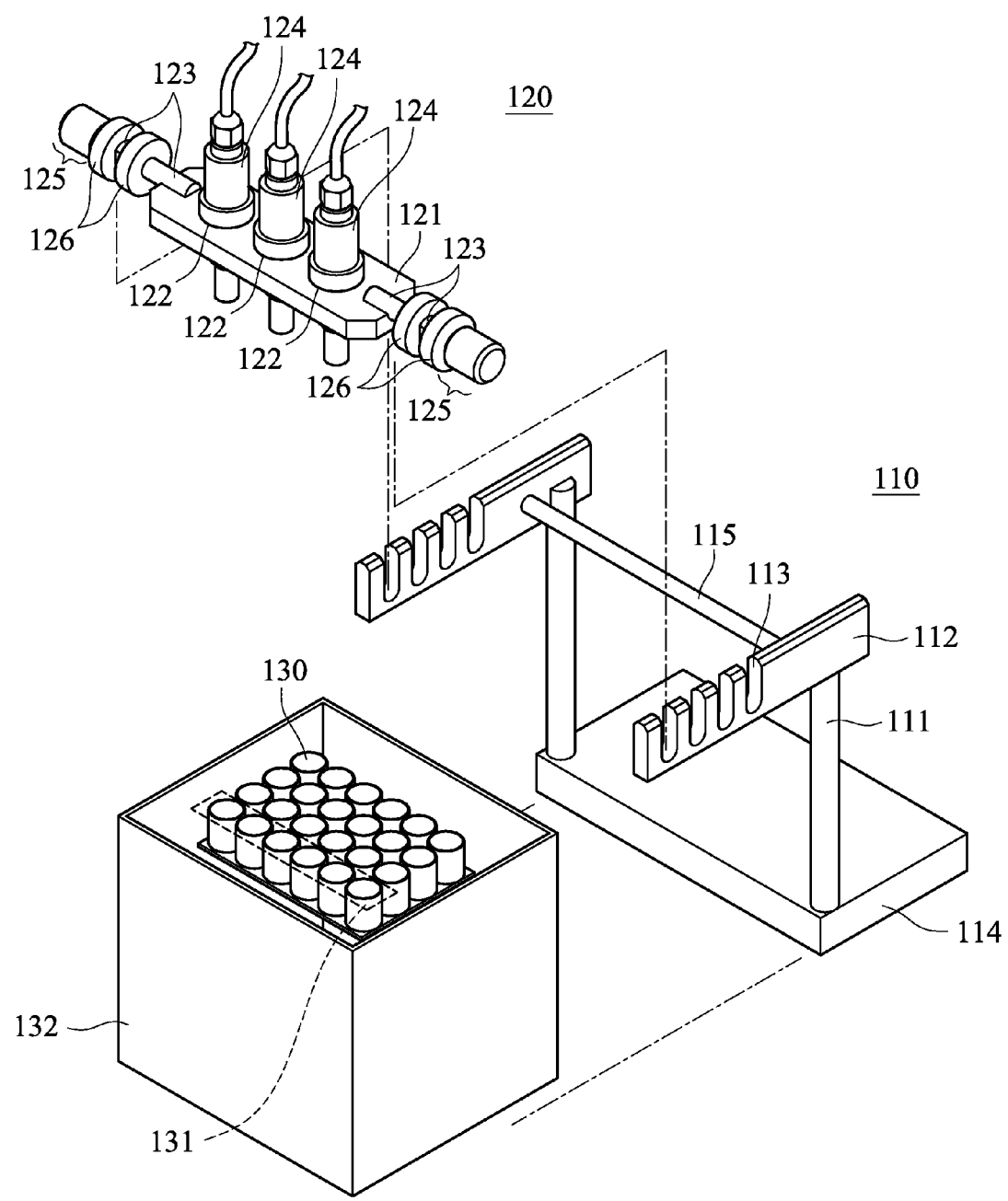
FIG. 1B is an exploded perspective view of the system depicted in FIG. 1A.

Referring to FIG. 1A and FIG. 1B, an array-type-transducer-based high-power ultrasound delivery system 100 according to an embodiment of the present invention includes a support bracket 110, an array-type ultrasound transducer 120, and a plurality of containers 130.

As shown in FIG. 1B, the support bracket 110 includes a set of first support members 111 and a set of second support members 112. The set of first support members 111 includes at least two first support members 111. Likewise, the set of second support members 112 includes at least two second support members 112. Each first support member 111 is a vertically standing post that forms a vertical height. Each second support member 112 is a plate horizontally connected to one end of a corresponding one of the first support members 111 such that both the second support members 112 extend toward the same side of the first support members 111.

Each second support member 112 has a plurality of grooves 113. The depth of the grooves 113 not only determines the depth by which the ultrasound transducers 124 (as described further below) of the array-type transducer 120 can dip into the containers 130, but also enables accurate alignment between the ultrasound transducers 124 and the containers 130. The grooves 113, which are shown as U-shaped grooves by way of example, are arranged at one end of each second support member 112 and are away from the position where each second support member 112 is connected to the corresponding first support member 111.

Figure 2:
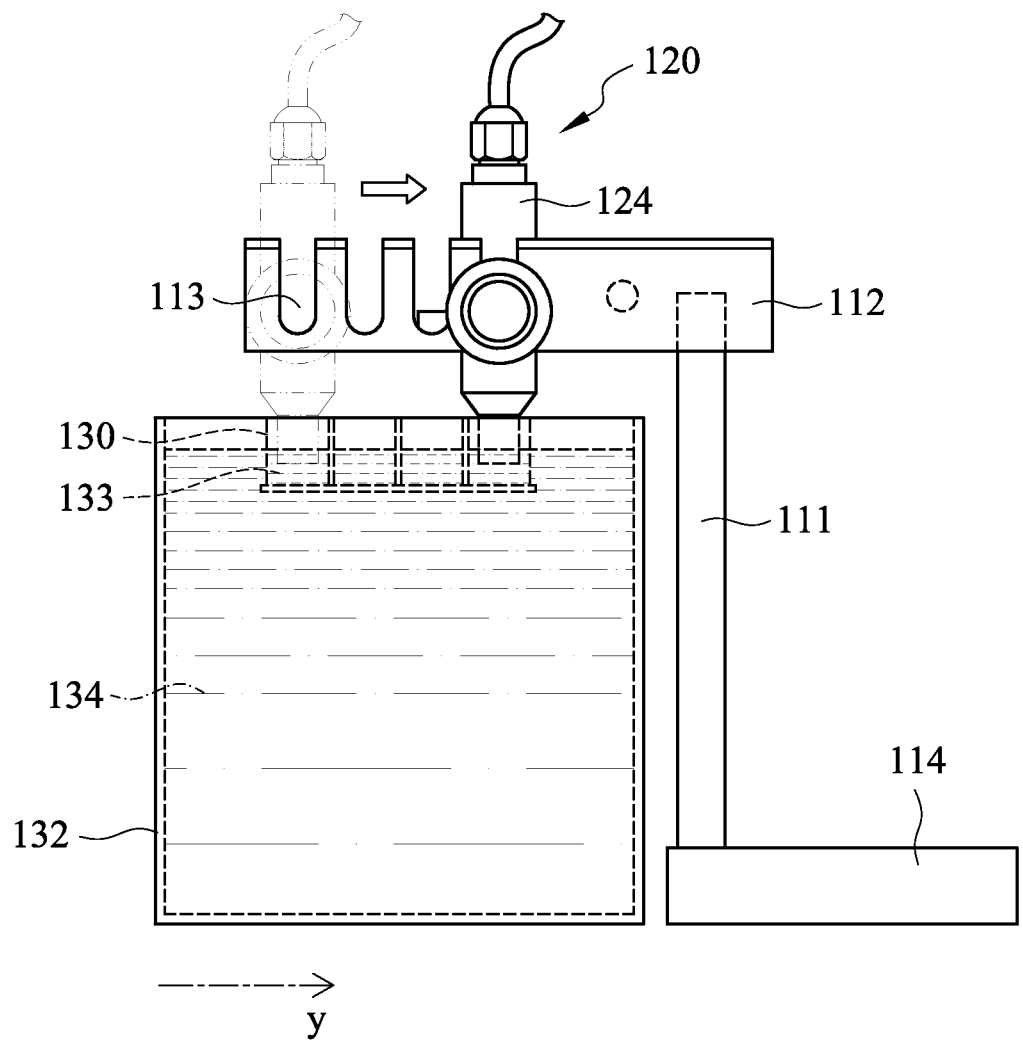
FIG. 2 is a side elevational view of the system depicted in FIG. 1A.

In this embodiment, the first support members 111 are spaced apart from each other, and the second support members 112 are connected to the upper ends of the first support members 111 respectively. Further, a transverse bar 115 is provided between the second support members 112 to keep the distance therebetween, thus allowing the second support members 112 to remain parallel to each other. Moreover, the bottom portion of the support bracket 110 is connected with a base plate 114 for supporting the support bracket 110 in a firm and stable manner. When viewed from the side, the assembly of the base plate 114 and the support bracket 110 has a generally Z shape, as shown in FIG. 2.

The array-type ultrasound transducer 120 includes a clamp 121 and N ultrasound transducers 124, where N is a positive integer. The clamp 121 has N openings 122, and the openings 122 are arranged in a one-dimensional array. In other words, the openings 122 are linearly arranged on the clamp 121 at a fixed spacing.

Each opening 122 is configured for receiving and clamping one ultrasound transducer 124, and the ultrasound transducers 124 are engaged in the openings 122 respectively. The ultrasound transducers 124 can be high-power ultrasound transducers. Apart from securing the ultrasound transducers 124, the clamp 121 serves to facilitate movement of the ultrasound transducers 124, as explained below.

A wedge 123 is provided on each of two lateral sides of the clamp 121. The wedges 123 can be moved along a Y-axis direction to connect with the grooves 113. Thus, the clamp 121 can be moved along the Y-axis direction and engage with different grooves 113 by means of the wedges 123.

Each wedge 123 is formed with at least one grip portion 125 on the outer side. When the array-type-transducer-based high-power ultrasound delivery system 100 is manually operated, the grip portions 125 can be held by hand in order to move the clamp 121. When the system 100 is operated by mechanical arms or the like, the grip portions 125 are gripped by the mechanical arms so that the clamp 121 can be moved in a fully or partially automatic manner.

Each wedge 123 has a post-like structure and is provided with at least one positioning element 126. The wedges 123, together with the positioning elements 126, allow the array-type ultrasound transducer 120 to move in an X-axis direction. Each positioning element 126 is a protruding structure for securing the clamp 121 in position in the grooves 113 and limiting the range of movement of the wedges 123 along the X-axis direction.

The containers 130 are arranged in a two-dimensional matrix. Each X-axis array 131 of the two-dimensional matrix is composed of A containers 130 arranged along the X-axis direction, where A is a positive integer. Along the Y-axis direction, the containers 130 form M X-axis arrays 131, where M is also a positive integer. Referring to FIG. 2, the containers 130 can be Petri dishes for holding an ultrasound-conducting medium 133. The ultrasound-conducting medium 133 can be a liquid.

As shown in FIG. 2, the array-type-transducer-based high-power ultrasound delivery system 100 may further include a temperature-adjusting water tank 132 for receiving and heating the containers 130. The temperature-adjusting water tank 132 may contain water 134 or other substances for adjusting the temperatures of the containers 130 and of the ultrasound-conducting medium 133.

Figure 3:
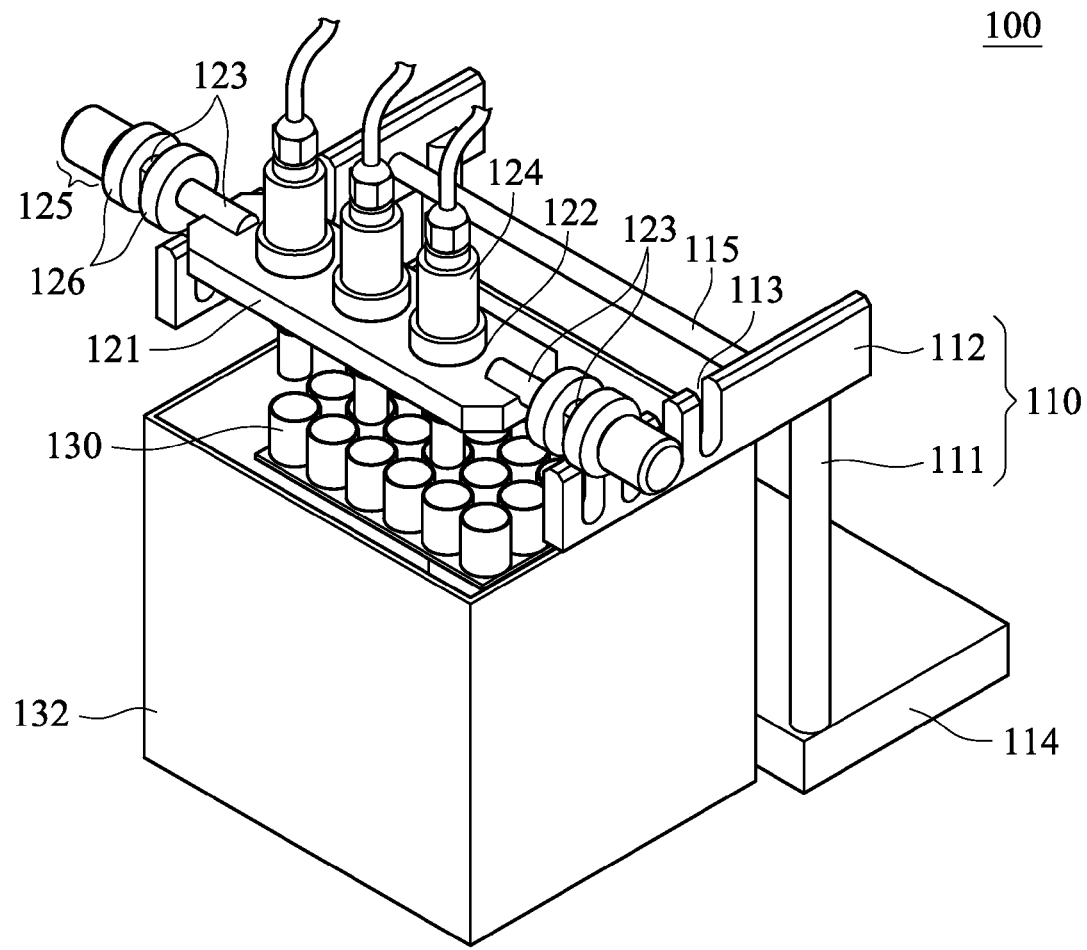
FIG. 3 is a perspective view of the system depicted in FIG. 1A, wherein the ultrasound transducers have left the containers.

With reference to FIG. 2, which is a side elevational view of the array-type-transducer-based high-power ultrasound delivery system 100, the array-type ultrasound transducer 120 can be moved along the Y-axis direction from one pair to another pair of the grooves 113, so as for the ultrasound transducers 124 to continue processing different containers 130. Referring also to FIG. 3, the array-type ultrasound transducer 120 is displaced vertically away from the containers 130 before it can be moved in the Y-axis direction.

Figure 4:
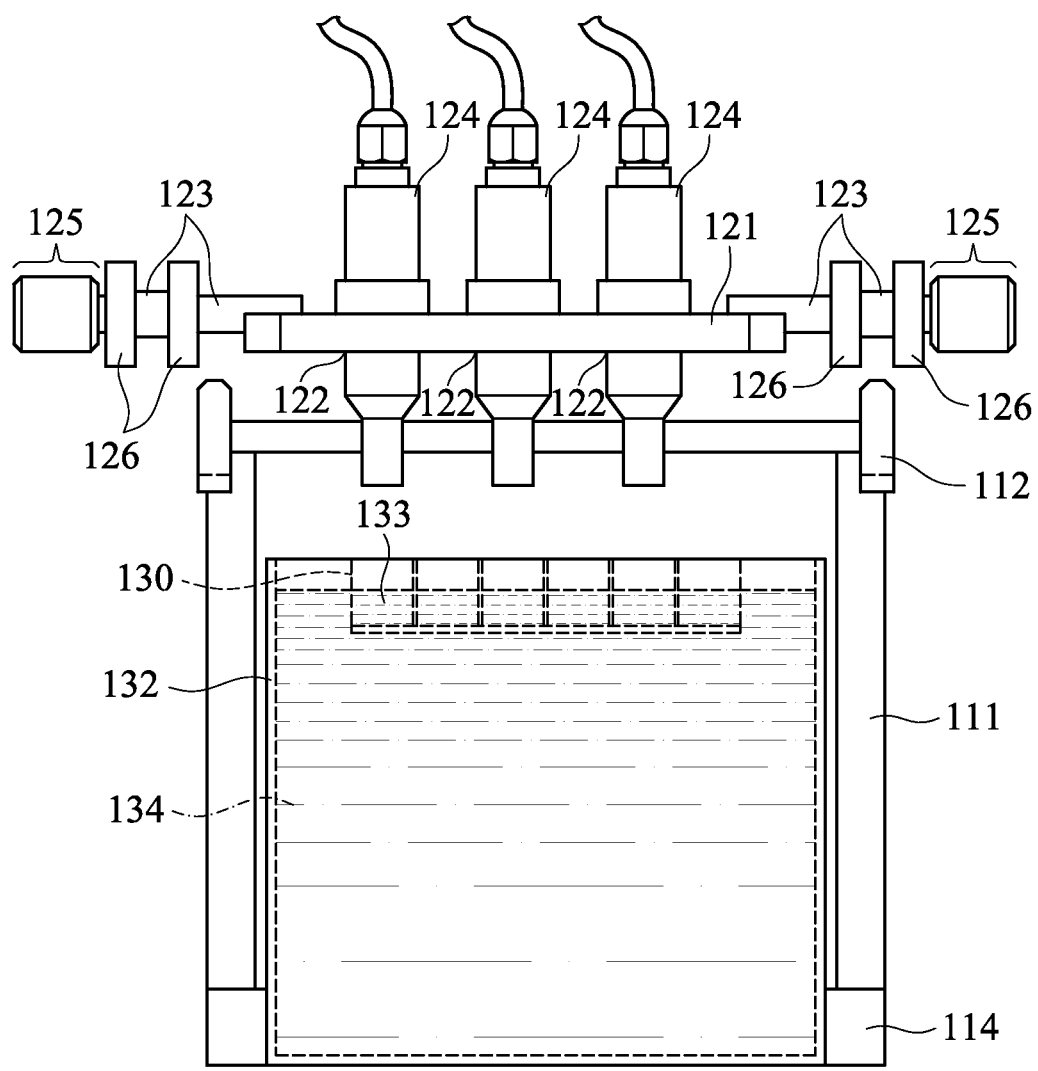
FIG. 4 is a front elevational view of the system depicted in FIG. 1A, wherein the ultrasound transducers have left the containers.
Figure 5:
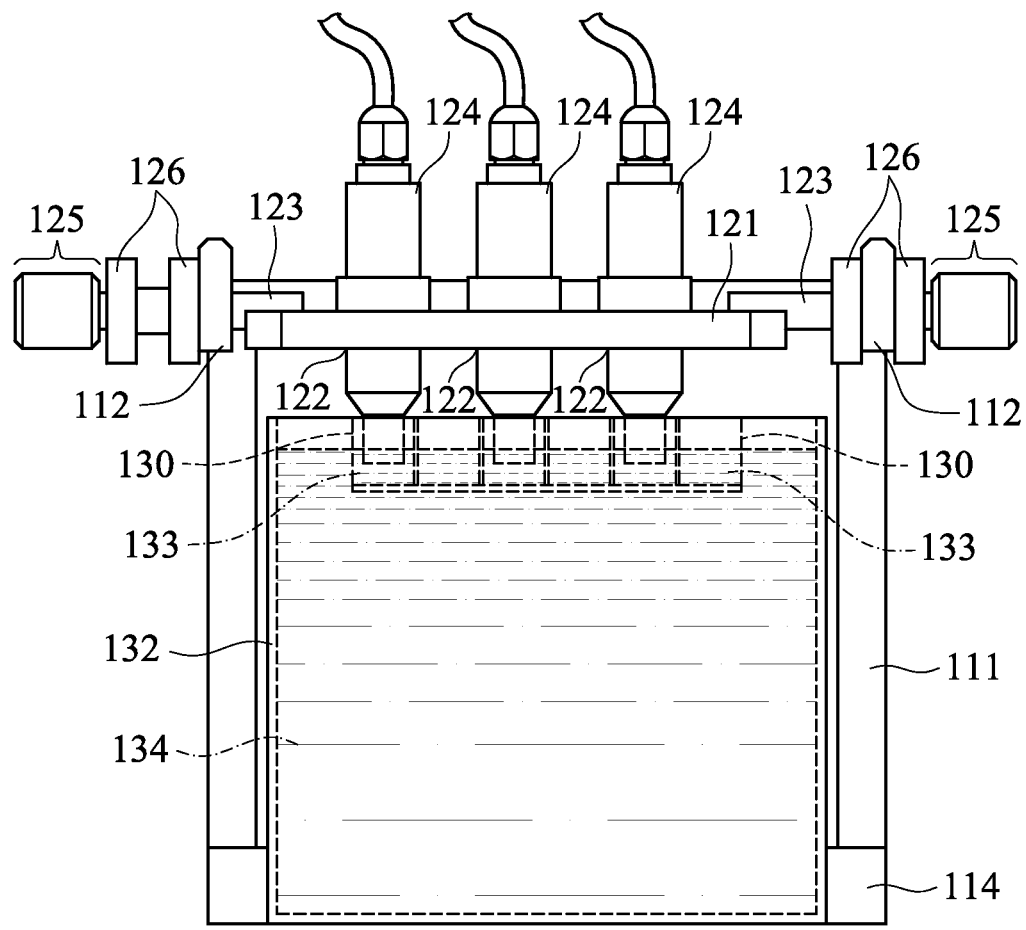
FIG. 5 is another front elevational view of the system depicted in FIG. 1A, wherein the ultrasound transducers are dipped in the containers.

Referring to FIG. 4 and FIG. 5, the ultrasound transducers 124 can be vertically moved so as to dip into or leave the ultrasound-conducting medium 133 in the containers 130.

In this embodiment, referring back to FIG. 1B, A is 6, and M is 4. Therefore, the containers 130 are arranged in a 6×4 or 3×2 two-dimensional matrix, wherein each X-axis array 131 includes six containers 130 arranged along the X-axis direction, and four X-axis arrays 131 are formed along the Y-axis direction. Moreover, each second support member 112 has four grooves 113 that correspond in position to the containers 130 in the Y-axis direction. Thus, even if the wedges 123 of the array-type ultrasound transducer 120 are engaged in different grooves 113, the ultrasound transducers 124 will be in accurate alignment with the containers 130.

Additionally, with N being 3 in the present embodiment, the clamp 121 has three openings 122, and the array-type ultrasound transducer 120 includes three ultrasound transducers 124, wherein each ultrasound transducer 124 is engaged in one opening 122. Therefore, when the clamp 121 of the array-type ultrasound transducer 120 is connected with the grooves 113, three containers 130 can be processed at the same time to increase operation speed.

In this embodiment, the array-type ultrasound transducers 120 can be moved vertically upward to leave the containers 130, then moved along the Y-axis direction to the containers 130 in the next X-axis array 131, and then moved vertically downward so as for the ultrasound transducers 124 to dip into the containers 130. Furthermore, as the array-type ultrasound transducer 120 can be moved in a fully or partially automatic manner or manually, not only can the depth of the grooves 113 be designed to control the depth by which the ultrasound transducers 124 dip into the containers 130, thus reducing operational variables, but also the requirement for labor can be lowered.

The features of the present invention are disclosed above by the preferred embodiment to allow persons skilled in the art to gain insight into the contents of the present invention and implement the present invention accordingly. The preferred embodiment of the present invention should not be interpreted as restrictive of the scope of the present invention. Hence, all equivalent modifications or amendments made to the aforesaid embodiment should fall within the scope of the appended claims.

What is claimed is:

1. An array-type-transducer-based high-power ultrasound delivery system, comprising:
   a support bracket comprising a set of first support members for forming a vertical height and a set of second support members, each said second support member being horizontally connected to an end of a corresponding one of the first support members and having a plurality of grooves; and
   an array-type ultrasound transducer comprising a clamp and N ultrasound transducers, where N is a positive integer, the clamp having N openings arranged in a one-dimensional array, the clamp further having two lateral sides each provided with a wedge, the wedges being movable along a Y-axis direction to engage in the grooves, the ultrasound transducers being engaged in the openings.

2. The array-type-transducer-based high-power ultrasound delivery system of claim 1, wherein the grooves are U-shaped grooves.

3. The array-type-transducer-based high-power ultrasound delivery system of claim 1, wherein the support bracket has a bottom portion connected with a base plate.

4. The array-type-transducer-based high-power ultrasound delivery system of claim 1, wherein each said wedge has an outer side formed with at least a grip portion.

5. The array-type-transducer-based high-power ultrasound delivery system of claim 1, wherein each said wedge is a post-like structure.

6. The array-type-transducer-based high-power ultrasound delivery system of claim 1, wherein each said wedge is provided with at least a positioning element.

7. The array-type-transducer-based high-power ultrasound delivery system of claim 6, wherein the wedges and the positioning elements allow the array-type ultrasound transducer to move along an X-axis direction.

8. The array-type-transducer-based high-power ultrasound delivery system of claim 1, wherein the ultrasound transducers are high-power ultrasound transducers.

9. The array-type-transducer-based high-power ultrasound delivery system of claim 1, further comprising a plurality of containers arranged in a two-dimensional matrix, wherein each X-axis array of the two-dimensional matrix is composed of A said containers arranged along an X-axis direction, A being a positive integer, and wherein the ultrasound transducers can be vertically moved so as to dip into or leave an ultrasound-conducting medium in the containers.

10. The array-type-transducer-based high-power ultrasound delivery system of claim 9, wherein the containers form M said X-axis arrays in the Y-axis direction, M being a positive integer.

11. The array-type-transducer-based high-power ultrasound delivery system of claim 10, further comprising a temperature adjusting water tank for receiving and heating the containers.

* * * * *